May 24, 1927.
C. H. BRASELTON ET AL
1,629,857
PUMPING MECHANISM
Original Filed Feb. 20, 1922
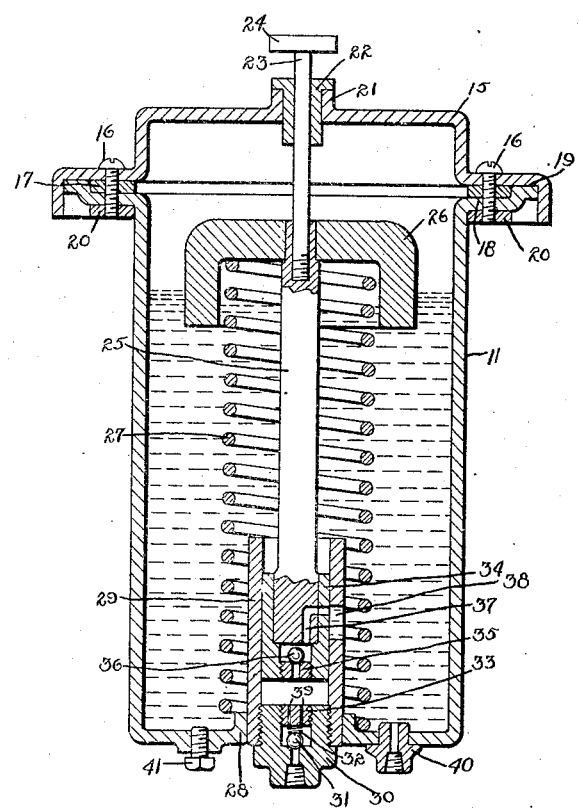
INVENTOR.
Chester W Braselton
BY Fred B. MacLaren
Chester H Braselton ATTORNEYS.

Patented May 24, 1927.

1,629,857

UNITED STATES PATENT OFFICE.

CHESTER H. BRASELTON, OF NEW YORK, AND FRED B. MacLAREN, OF MALBA, NEW YORK; SAID MacLAREN ASSIGNOR TO SAID BRASELTON.

PUMPING MECHANISM.

Application filed February 20, 1922, Serial No. 537,681. Renewed October 30, 1926.

This invention relates to improvements in fuel feed apparatus operated by vibration imparted thereto, it being particularly adapted for use in fuel systems for automotive vehicles and constitutes an improvement over the structures shown in our co-pending application entitled "Fuel supply system," Serial Number 533,493, filed February 1, 1922, in which the right to claim the invention broadly is reserved.

The object of the invention is the provision of means for the above purpose which shall be of simple construction, small cost, and of a nature which can be assembled and disassembled by unskilled labor.

Another object of the invention is the provision of means for making a tight joint on the cover without distorting the internal guiding surfaces.

A further object of the invention is the provision of governing means operated by the height of liquid in the storage tank.

Other objects and objects relating to details of construction and economies of manufacture, will appear as we proceed with that description of the preferred form of our invention which, for the purposes of the present application, we have illustrated in the accompanying drawings.

Figure I is a diagrammatic elevational view of an automobile equipped with our improved apparatus.

Figure II is a central longitudinal sectional view of the auxiliary tank and pumping apparatus.

In Figure I we have illustrated the preferred arrangement of the different portions of our fuel feed apparatus upon an automobile, 10 being the main fuel tank, 11 the auxiliary tank, and 12 the carburetor. The tank 10 is connected by means of a tube 13 with the bottom of the tank 11 while the tube 14 forms the connection between the carburetor 12 and the tank 11.

In Figure II the tank 11 is shown as a cylindrical drawn shell having a stamped cover 15 fastened to it by screws 16. Between the cover 15 and the flanged edge of the tank 11 is a gasket 17. The flanged edge of the tank 11 is shown with two surfaces. The surface 18 being sufficiently lower than the surface 19 that the gasket 17 will be slightly compressed when the cover 15 is brought solidly into contact with the surface 19. The nuts 20 cooperate with the screws 16 to hold the cover in place.

In the center of the cover 15 is formed a boss 21 in which is fitted a flanged sleeve 22 made of wood impregnated with graphite for the purpose of forming a bearing for the rod 23 which can have some play without becoming noisy. The head 24 is fastened to the rod 23 to provide an easily operated handle for the pump.

The rod 23 is screwed into the bar 25, the fit being made with a cylindrical part at the top and the threaded portion at the bottom in order that the rod 23 can be held central without depending on the straightness of the tapped part of the rod 25. The bar 25 has secured to it a cup shaped weight 26 by means of a press fit and shoulder. The spring 27 is arranged to press against the under side of the cup 26 and rests on the bottom of the tank 11. An internal boss 28 is pressed into the tank 11 and into this boss is fitted a cylinder 29. A plug 30 is screwed into the bottom of the cylinder 29 and contains the ball valve 31, a spring 32, and a valve retaining nut 33. On the bottom of the rod 25 is pressed a cap 34 into which is screwed a valve seat 35 and upon which rests the discharge valve 36. A passage 37 is made in the bar 25 and cap 34 which cooperates with the slot 38 to form a discharge passage from the valve chamber to the interior of the tank 11. Holes 39 in the valve retaining plug 33 form the inlet passage to the pump chamber.

The plug 40 is soldered into the bottom of the tank 11 its top projecting somewhat above the bottom of the tank and the carburetor connection 14 is suitably fastened to it. A plug 41 is arranged in the bottom of the tank so that water may be drained or sediment flushed out.

The tank and pump may be attached to any part of the vehicle but we have found that it should be mounted as close to the front axle as possible because the period of the front springs is generally shorter than that of the rear springs and a greater portion of the total vibration of the car may then be used for pumping.

As a vehicle equipped with our improved apparatus moves over even the smoothest road it is subjected to constant vibration in a vertical plane. The period of these vibrations ranges from approximately a quarter second over the front springs to three-quarters of a second over the rear springs. We take advantage of these vibrations by mounting a relatively heavy weight 26 upon a spring 27 compressed to such an extent that it has a relatively long period of vibration compared to that of the portion of the car to which the pump is attached. The cap 34 attached to the weight 26 through the rod 25 forms the movable organ of the pump the inlet valve of which is represented by the ball valve shown in the bottom of the cylinder 29 and the discharge valve of which is located between the cap 34 and the rod 25.

When in action liquid will be pumped from the rear tank 10 to the interior of the tank 11 until the level of the liquid in the tank 11 has become high enough to change the amount of weight resting on the spring 27 by the weight of the liquid displaced by the weight 26 and the air chamber formed under it. This reduction in weight tends to change the locus of movement of the pump plunger because the spring will extend until a new point of balance is reached. The slot 38 and the passage 37 are so arranged that when this change in the locus of movement is caused by the rise in level of the liquid in the tank 11 the flow of liquid from the pump chamber is restricted and if the liquid rises high enough the flow will be completely stopped thus forming a governing means for the pump.

The pump plunger is guided by the cap 34 sliding in the cylinder 29 and the rod 23 sliding in the bushing 22. It is of great importance that the axes of the bushing 22 and the cylinder 29 should be identical to prevent binding or friction. This has been accomplished by providing a metal bearing surface 19 for the cap 15 which will allow the bushing 22 to be located properly without distortion due to varying thickness of the gasket 18 or to varying pressure brought on this gasket by uneven tightening of the screws 16. To prevent eccentricity of the axes of bushing 22 and pump cylinder 29 a rim has been flanged on the cover 15 to fit the exterior of the surface 19. It is evident that the surface 19 could be formed on the inside of the flange on the tank 11 and the gasket located on the outside or the bearing surface 19 might be located in the middle of the flange and two gaskets used one inside and one outside of the surface 19. The nuts 20 can be made part of the under part of the surface 18 or cylindrical surfaces might be punched from the surface 18 of sufficient length to be threaded to fit the screws 16.

In Figure II the nuts are shown so close to the tank cylindrical surface that turning is prevented when tightening the screws 16.

The fit of the bushing 22 around the rod 23 should be rather loose as this fit acts as an air vent to allow the liquid in the tank to flow readily to the carburetor. This loose fit has a tendency to cause rattle which can be remedied by making the bushing of some soft material such as wood impregnated with graphite, bakelite, or similar material.

The weight 26 might be made integral with the rod 25 but in any case the combined weight of the reciprocating mass should not be less than 7 pounds per square inch of the piston area if advantage is to be taken of the smaller vibrations of the car. The spring 27 should have such deflection that a small change in weight of the reciprocating mass will cause a relatively large movement. To get a satisfactory period of vibration for the spring 27 a deflection of not less than 3 inches when acted on by the whole reciprocating weight has been found necessary. The weight 26 might be made hollow and of relatively thin wall to provide a large difference in effective weight when the liquid rises to the required level but it has been found that the construction shown gives sufficient difference to effectively govern the height of the liquid in the tank 11.

Having described our invention what we claim is:

1. The combination of a vibratory receiving tank; a pump adapted to pump liquid into said receiving tank as the latter is vibrated; a weight for aiding the pumping operation of the pump; and means whereby the amount of liquid pumped by a certain definite pumping movement of the moving parts of the pump is reduced as the liquid in the receiving tank reaches a level to exert a buoying force upwardly upon the weight.

2. The combination of a receiving tank containing a pump chamber and adapted to be vibrated; a piston working in the pump chamber; valves to control the inlet and outlet of liquid from the pumping space; an outlet from the valves to the receiving space in the tank; means for yieldingly maintaining the piston at a point of balance; means whereby when the liquid in the receiving tank reaches a sufficient level the locus of movement of the piston is changed to obstruct said outlet restricting the freedom of flow of the liquid from the pump chamber to the receiving space in the tank.

3. The combination of a vibratory pump tank containing an inertia piston for the pump; manually operated means connected with the piston whereby it may be moved relative to the tank without vibration of the latter and from the outside of the tank; and a noise reducing bushing surrounding the manual operating means at its exit from the tank through which the manual operating means may be operated.

4. The combination of a vibratory pump tank; an inertia piston working in the pump; yielding means for maintaining the piston at a point of balance, and a weight for the piston of a shape adapted to entrap air in a space on its under side when the liquid surrounds the bottom portion of the weight whereby the buoyancy effect upon the weight will be increased when the liquid in the tank reaches a certain level, to change the locus of movement of the piston relative to the tank when the latter is vibrated and an outlet port positioned in said pump, said port being so positioned as to be obstructed by the upward movement of the vibratory weight.

5. The combination of a vibratory receiving tank; a pump adapted to pump liquid into said receiving tank as the latter is vibrated; a weight for aiding the pumping operation of the pump; and means whereby the amount of liquid pumped by a certain definite pumping movement of the moving parts of the pump is reduced.

6. The combination of a vibratory receiving tank; a pump adapted to pump liquid into said receiving tank as the latter is vibrated; a weight for aiding the pumping operation of the pump; and means whereby the amount of liquid pumped by a certain pumping movement of the moving parts of the pump is reduced as the liquid in the receiving tank reaches a level to exert a buoying force upwardly upon the weight, said means comprising an inverted cup-shaped weighted member adapted to trap air therein as the liquid level rises.

7. In a device of the class described, the combination of a vibratory receiving tank; a pump within said tank having a reciprocatable piston and a weighted member fixed to said piston, said weighted member being formed in the shape of an inverted cup with its edges dependent and adapted to trap air when the level of the liquid rises to a point above the lower edges of the weight.

8. In a device of the class described, the combination of a vibratory receiving tank; a pump within said tank having a reciprocatable piston; an outlet port connected to said pump; a weighted member connected to the piston, the locus of movement of the piston being elevated when the level of liquid in the receiving tank contacts with the weighted member, and said outlet port being obstructed when the locus of the piston movement is elevated.

In testimony whereof, we affix our signatures.

CHESTER H. BRASELTON.
FRED B. MacLAREN.